(12) United States Patent
Miyoshi et al.

(10) Patent No.: US 11,427,726 B2
(45) Date of Patent: Aug. 30, 2022

(54) INKS

(71) Applicant: TOSHIBA TEC KABUSHIKI KAISHA, Tokyo (JP)

(72) Inventors: Maiko Miyoshi, Izunokuni Shizuoka (JP); Tsuyoshi Itou, Izunokuni Shizuoka (JP); Takafumi Hara, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 335 days.

(21) Appl. No.: 16/545,768

(22) Filed: Aug. 20, 2019

(65) Prior Publication Data

US 2020/0071556 A1    Mar. 5, 2020

(30) Foreign Application Priority Data

Aug. 28, 2018 (JP) .............................. JP2018-159340

(51) Int. Cl.
*C09D 11/50* (2014.01)
*C09D 11/38* (2014.01)
(Continued)

(52) U.S. Cl.
CPC ............ *C09D 11/50* (2013.01); *B41J 2/2107* (2013.01); *B41M 5/0023* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; B41J 11/0021;
(Continued)

(56) References Cited

U.S. PATENT DOCUMENTS 6,203,603 B1 * 3/2001 Takayama .............. B41M 5/128
106/31.16
8,889,590 B2   11/2014 Kwan
(Continued)

FOREIGN PATENT DOCUMENTS

JP    2000056497 A    2/2000
JP    2000109896 A    4/2000
(Continued)

OTHER PUBLICATIONS

Japanese Office Action dated Mar. 8, 2022, mailed in counterpart Japanese Application No. 2018-159340, 9 pages (with translation).

*Primary Examiner* — Manish S Shah
(74) *Attorney, Agent, or Firm* — Kim & Stewart LLP

(57) ABSTRACT

According to one embodiment, an ink which can be decolored upon heating is provided. Colored images can be formed with the ink by various methods, such as ink jetting or the like, then later the images can be decolored with heat. An ink according to an embodiment contains a color developable compound, a color developing agent that causes the color developable compound to develop a color, a nonaqueous solvent, and a decoloring agent that is insoluble in the nonaqueous solvent and decolors the color developable compound upon heating.

20 Claims, 1 Drawing Sheet

(51) Int. Cl.
*C09D 11/36* (2014.01)
*C09D 11/328* (2014.01)
*B41M 5/00* (2006.01)
*C09D 11/037* (2014.01)
*C09D 11/06* (2006.01)
*B41J 2/21* (2006.01)
*C09D 11/033* (2014.01)

(52) U.S. Cl.
CPC .......... *C09D 11/033* (2013.01); *C09D 11/037* (2013.01); *C09D 11/06* (2013.01); *C09D 11/328* (2013.01); *C09D 11/36* (2013.01); *C09D 11/38* (2013.01)

(58) Field of Classification Search
CPC . B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237

See application file for complete search history.

(56) References Cited

U.S. PATENT DOCUMENTS

| 2003/0099894 | A1* | 5/2003 | Tsubuko | G03G 13/10 430/116 |
| 2007/0131137 | A1* | 6/2007 | Kitawaki | C09D 11/36 106/31.6 |
| 2007/0200906 | A1* | 8/2007 | Komatsu | B41J 2/1721 347/90 |
| 2012/0052261 | A1* | 3/2012 | Aoyama | B41M 5/0011 347/20 |
| 2013/0172181 | A1* | 7/2013 | Kwan | C09B 67/0097 106/31.29 |
| 2014/0060382 | A1* | 3/2014 | Adamic | C09D 11/36 106/31.32 |

FOREIGN PATENT DOCUMENTS

| JP | 2000154345 A | 6/2000 |
| JP | 2008239904 A | 10/2008 |
| JP | 2011140155 A | 7/2011 |
| JP | 2011140557 A | 7/2011 |
| JP | 2015509121 A | 3/2015 |

* cited by examiner

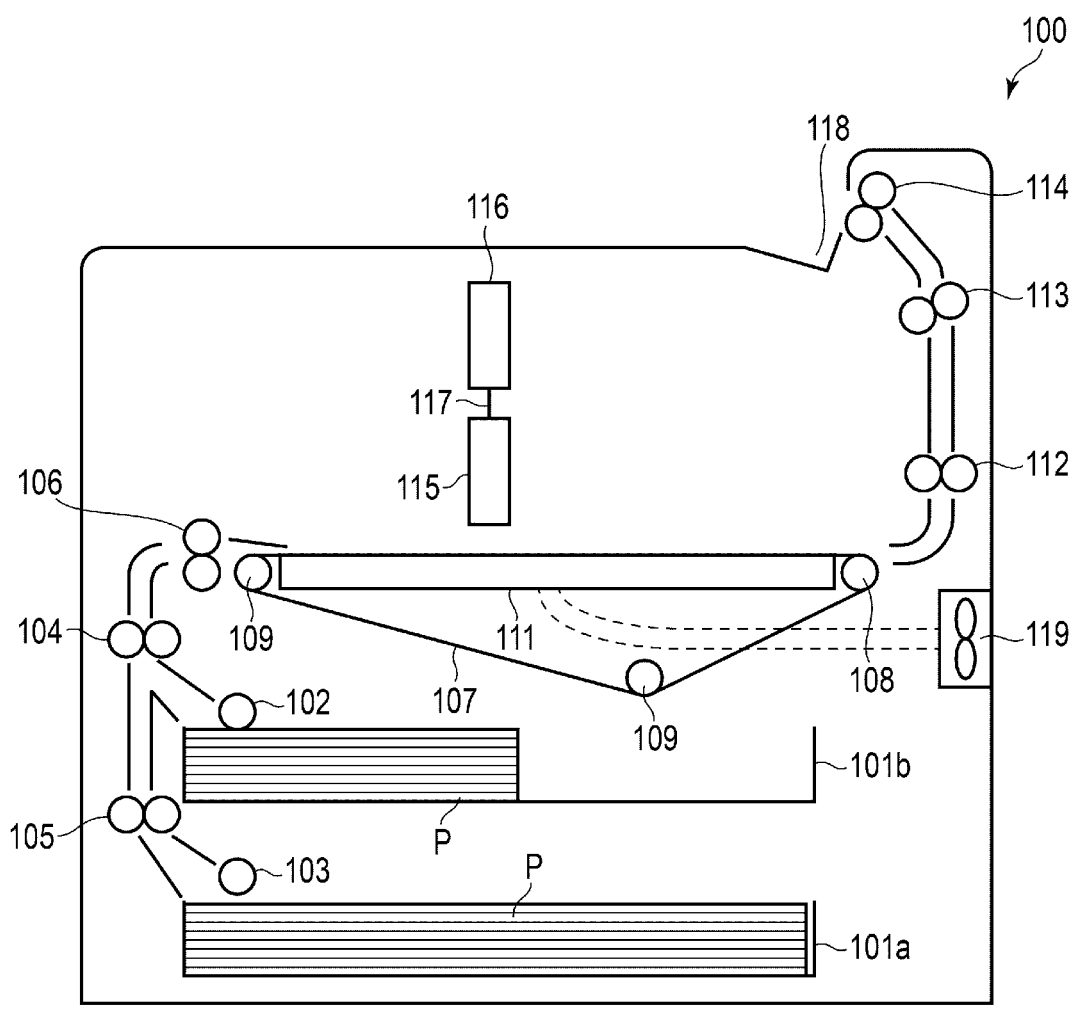

INKS

CROSS-REFERENCE TO RELATED APPLICATION

This application is based upon and claims the benefit of priority from Japanese Patent Application No. 2018-159340, filed on Aug. 28, 2018 the entire contents of which are incorporated herein by reference.

FIELD

Embodiments described herein relate to inks.

BACKGROUND

Recently, the amount of paper and other recording media has seen reductions in demand for reasons of environmental protection, economic efficiency, and the like. As one method of further reducing the overall demand for paper and other media types, a thermochromic ink composition that can become substantially colorless upon interaction or contact with a decoloring agent has been developed. Specifically, an irreversible thermochromic ink composition containing a chromic dye, a color activator, a decoloring agent, and a wax for chemically separating the chromic dye and the color activator from the decoloring agent was previously developed.

DESCRIPTION OF THE DRAWING

FIG. 1 is a schematic view showing one example of an image forming apparatus to which an ink according to an embodiment can be applied.

DETAILED DESCRIPTION

According to one embodiment, an ink containing a color developable compound, a color developing agent that causes the color developable compound to develop a color, a nonaqueous solvent, and a decoloring agent that is insoluble in the nonaqueous solvent and decolors the color developable compound upon heating is provided.

1. Configuration of Ink

An ink according to an embodiment contains a color developable compound, a color developing agent that causes the color developable compound to develop a color, a nonaqueous solvent, and a decoloring agent that is insoluble in the nonaqueous solvent and decolors the color developable compound with heating.

<Color Developable Compound>

The color developable compound is a substance that develops a color by reacting with a color developing agent. The color developable compound is preferably an electron-donating substance.

Examples of a color developable compound include an electron-donating organic substance such as a leuco dye, a leucoauramine, a rhodamine B lactam, an indoline, a spiropyran, and a fluoran.

In some examples, a color developable compound may be or include the following dyes.

Among crystal violet lactone (CVL), malachite green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chloro fluoran, 2-anilino-6-(N-methyl-N-isobutylamino)-3-methylfluoran, 2-anilino-6-(dibutylamino)-3-methylfluoran, 3-chloro-6-(cyclohexylamino)fluoran, 2-chloro-6-(diethylamino) fluoran, 7-(N,N-dibenzylamino)-3-(N,N-diethylamino) fluoran, 3,6-bis(diethylamino)fluoran-γ-(4'-nitro) anilinolactam, 3-diethylaminobenzo[a]-fluoran, 3-diethylamino-6-methyl-7-aminofluoran, 3-diethylamino-7-xylidinofluoran, 3-(4-diethylamino-2-ethoxyphenyl)-3-(1-ethyl-2-methylindol-3-yl)-4-azaphthalide, 3-(4-diethylaminophenyl)-3-(1-ethyl-2-methylindol-3-yl)phthal ide, 3-diethylamino-7-chloroanilinofluoran, 3-diethylamino-7,8-benzofluoran, 3,3-bis(1-n-butyl-2-methylindol-3-yl)phthalide, 3-6-dimethylethoxyfluoran, 3-diethylamino-6-methoxy-7-aminofluoran, DEPM, ATP, ETAC, 2-(2-chloroanilino)-6-dibutylaminofluoran, crystal violet carbinol, malachite green carbinol, N-(2,3-dichlorophenyl) leucoauramine, N-benzoylauramine, rhodamine B lactam, N-acetylauramine, N-phenylauramine, 2-(phenyliminoethanedilidene)-3,3-dimethylindoline, N-3,3-trimethylindolinobenzospiropyran, 8'-methoxy-N-3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benz-6-diethylaminofluoran, 3,6-di-p-toluidino-4,5-dimethylfluoran-phenylhydrazide-γ-lactam, and 3-amino-5-methylfluoran, one or more dyes can be used.

These materials can be used alone or two or more types may be mixed together. By appropriately selecting the color developable compounds, colored states of various colors can be obtained, and therefore, many colors can be expressed by color developable compounds.

The ink according to the embodiment contains a color developable compound in an amount preferably ranging from 5 to 50 parts by mass, more preferably ranging from 10 to 40 parts by mass, to each 100 parts by mass of color developing agent.

<Color Developing Agent>

The color developing agent is a substance that causes the color developable compound to develop or express a color. The color developing agent is preferably an electron-accepting substance. According to one example, when the color developable compound is bound to the surface of the color developing agent, an electron is given to the color developing agent from the color developable compound, and as a result, the color developable compound develops a color. A particle in which the color developable compound develops a color by binding between the color developing agent and the color developable compound is referred to as "colored particle".

As the color developing agent, a silicon oxide is preferably used. Silica, particularly active silica can be used. Here, "active silica" means silica having high reactivity due to having a large surface area. Active silica has excellent thermal stability and can be produced with small particle sizes. Accordingly, the particle size of the colored particle based on active silica can be small, and therefore, use of active silica as the color developing agent is advantageous for forming a high-definition image. Further, such a color developing agent has high affinity for a hydrophilic substance, and therefore has particularly excellent reactivity with the below-mentioned decoloring agent.

As the color developing agent, a silicon oxide having a specific surface area, as measured by the Brunauer, Emmett and Teller (BET) method, in a range of 50 to 500 m$^2$/g, is preferably used, and a silicon oxide having a specific surface area in a range of 100 to 400 m$^2$/g is more preferably used.

The average primary particle diameter of the color developing agent is preferably in a range of 5 nm to 100 nm, more preferably in a range of 7 nm to 20 nm. The average primary particle diameter described here is calculated from the BET measured value. The term "average particle diameter" used below means the average primary particle diameter, and this average primary particle diameter is a value obtained by a dynamic light scattering method.

Specifically, as the color developing agent, for example, AEROSIL® 300 (Aerosil Co., Ltd.) and CAB-O-SIL® fumed silica HS-5 (Cabot Corporation) can be used.

The colored particle contains the color developing agent and the color developable compound directly bound to the surface of the color developing agent. The average particle diameter of the colored particles is preferably 10 μm or less, more preferably 1 μm or less. Further, when the colored particles are used in an inkjet-type ink, the average particle diameter of the colored particles is preferably in a range of 10 nm to 1000 nm, more preferably in a range of 50 nm to 200 nm.

The ink according to the embodiment contains the colored particles in an amount preferably ranging from 1 to 50 mass %, more preferably ranging from 5 to 30 mass %.

<Nonaqueous Solvent>

The nonaqueous solvent is a liquid other than water. The nonaqueous solvent is a fluid at 25° C. The nonaqueous solvent is a solvent in which the decoloring agent is substantially insoluble. By using a solvent in which the decoloring agent is insoluble, unwanted decoloration of the color developable compound in the ink by the decoloring agent can be prevented. The nonaqueous solvent may be a single component or may be a mixture of liquids.

Here, "insoluble" in the nonaqueous solvent means that the solubility of the decoloring agent at 25° C. is 0.1% or less.

The nonaqueous solvent is preferably a nonpolar solvent, for example, liquid paraffin is preferably used.

Here, "paraffin" is used as a generic name for alkanes having 20 or more carbon atoms and "liquid paraffin" is a substance as specified in Japanese Industrial Standards (JIS) K 2231:1993 "Liquid Paraffin" or equivalent.

Further, as the nonaqueous solvent, more specifically, for example, MORESCO WHITE® P-40 (MORESCO Corporation), liquid paraffin (Wako Pure Chemical Corporation), castor oil (Wako Pure Chemical Corporation), and TECLEAN® N-16 (Nippon Petrochemicals Co., Ltd.) can be used.

The ink according to the embodiment preferably contains the nonaqueous solvent in an amount ranging from 40 to 90 mass %.

<Decoloring Agent>

The decoloring agent is insoluble in the nonaqueous solvent. Further, the decoloring agent has a property of decoloring the color developable compound upon heating.

The average particle diameter of the decoloring agent at 25° C. is preferably 10 μm or less, more preferably 1 μm or less. Further, when the decoloring agent is used in an inkjet ink, the average particle diameter of the decoloring agent is preferably in a range of 10 nm to 1000 nm, more preferably in a range of 50 nm to 500 nm. The decoloring agent having an average particle diameter within the above-mentioned range has high dispersibility in the ink and is advantageous with respect to decoloring performance.

The decoloring agent is preferably a polyhydric alcohol. That is, the decoloring agent preferably has two or more hydroxy groups in the molecule, more preferably has three or more hydroxy groups in the molecule. The polyhydric alcohol has higher affinity for the surface of the color developing agent composed of an electron-accepting substance such as a silicon oxide than an alcohol having only one hydroxy group in the molecule. Therefore, use of the polyhydric alcohol as the decoloring agent is considered advantageous for obtaining an ink having excellent decoloring performance.

As the polyhydric alcohol, a sugar alcohol can be used. The decoloring agent is preferably a polyhydric alcohol that does not have a cyclic structure in the molecular structure. In other words, the decoloring agent is preferably a straight-chain polyhydric alcohol. A straight-chain polyhydric alcohol is considered to provide better decoloring performance than a polyhydric alcohol having a cyclic structure.

As a sugar alcohol, for example, xylitol, D-sorbitol, or D-mannitol can be used.

A polyhydric alcohol other than the sugar alcohol can also be used or used instead. For example, trimethylolpropane can be used.

The molecular weight of the decoloring agent is preferably in a range of 100 to 1000 (atomic mass units), more preferably in a range of 100 to 500.

The melting point of the decoloring agent is preferably in a range of 40 to 250° C., more preferably in a range of 50 to 200° C. When the melting point of the decoloring agent is too low, the color developable compound may be decolored at room temperature. When the melting point of the decoloring agent is too high, achieving decoloration will be more difficult.

The ink according to the embodiment contains the decoloring agent in an amount preferably ranging from 2 to 50 mass %, more preferably ranging from 5 to 30 mass %.

By using the decoloring agent in combination with the above-mentioned other components, an ink having excellent color developing performance and excellent decoloring performance upon heating can be obtained. A presumed, yet non-limiting, mechanism for color development and decoloration of the ink will be described below. Here, as one example, a case where the color developable compound is a leuco dye, the color developing agent is active silica, and the decoloring agent is a polyhydric alcohol will be described.

Under room temperature, a colored particle is formed by binding leuco dye, as a color developable compound, to the surface of active silica, as the color developing agent. After binding, a polyhydric alcohol, as the decoloring agent, in the form of a particle different from the colored particle is dispersed in a nonaqueous solvent. According to this, the decoloring agent does not decolor the colored particle, and the color developable compound develops a color.

When the ink is deposited on a recording medium, such as paper, the nonaqueous solvent is evaporated. When the thus deposited ink is heated, the polyhydric alcohol is melted and reacts with the surface of the active silica. That is, leuco dye bound to the surface of the active silica particles is replaced by the polyhydric alcohol. Accordingly, the amount of leuco dye bound to the surface of the active silica is reduced, and the ink is decolored.

<Other Additives>

The ink according to the embodiment may further contain additives in addition to the above-mentioned components. For example, the ink may further contain widely used aids in ink formulations such as a stabilizing agent, a viscosity adjusting agent, or a preservative.

As described above, in the ink according to the embodiment, elements including the colored particles composed of the color developable compound and the color developing agent and the decoloring agent in the form of a particle are dispersed in the nonaqueous solvent. When the particle size distribution for such an ink is measured, the average particle diameter of the ink is preferably 10 μm or less, more preferably 1 μm or less. Further, when such an ink is used for an inkjet ink, the average particle diameter of the ink is preferably in a range of 10 nm to 1000 nm, more preferably in a range of 50 nm to 500 nm.

2. Effect

The ink of above-described examples has excellent color developing performance and decoloring performance.

As a decoloring method, a two-liquid process is also considered. That is, a process in which an image is formed with an ink that contains the color developable compound and the color developing agent, but does not contain the decoloring agent. When decoloration with such an ink is to be performed, a liquid containing the decoloring agent is supplied on the printed ink thereby performing decoloration via use a liquid including the decoloring agent rather than heating. In such a case, there is no necessity to be concerned with decoloration of the color developable compound due to mixing of the color developable compound and the color developing agent with the decoloring agent within the ink itself. When such a two-liquid process is adopted, there are fewer restrictions on the combination of the color developable compound and the color developing agent with the decoloring agent. Therefore, in that case, for example, excellent color developing performance and decoloring performance can be achieved. However, in this two-liquid process, another liquid separately containing the decoloring agent is additionally required in addition to the decolorable ink.

The ink according to the example embodiment can achieve excellent color developing performance and decoloring performance without use of a two-liquid process.

Further, as a decolorable ink, an ink adopting a double capsule structure in which the color developing agent and the color developable compound are encapsulated by a first capsule film, and this capsule and the decoloring agent are encapsulated by a second capsule film is also considered. In that case, the color developing agent and the color developable compound are separated from the decoloring agent by the first capsule film, and therefore, the ink can exhibit excellent color developing performance. Further, when such a structure is adopted, the color developable compound and the color developing agent, and the decoloring agent are encapsulated in the same capsule by the second capsule film, and therefore, the ink has excellent decoloring performance. However, such a capsule structure tends to increase the particle size and reductions in particle size of such a structured material is not easy. Therefore, high-definition image formation is difficult with such an ink.

The ink according to the example embodiment can exhibit excellent color developing performance and decoloring performance without a capsule structure.

3. Method for Producing Ink

The ink according to an embodiment can be produced, for example, as follows.

First, colored particles are prepared. Specifically, the color developable compound and the color developing agent are mixed together with a solvent and stirred. Here, the solvent used for mixing is one of, acetone, tetrahydrofuran, or the like. Thereafter, the solvent is removed using, for example, a rotary evaporator, thereby obtaining a colored material. Then, this colored material is ground using, for example, a bead mill, thereby producing colored particles.

The decoloring agent is also ground using, for example, a bead mill in the same manner as the colored particles. The grinding of the decoloring agent may be performed simultaneously with the grinding of the colored body. That is, the colored body and the decoloring agent are mixed, and grinding may be performed on the resulting mixture.

Subsequently, the colored particles and the decoloring agent are both added to a nonaqueous solvent.

4. Application Mode of Ink

The above-mentioned ink can be used in, for example, an image forming apparatus. One example of a case where the above-mentioned ink is used in an image forming apparatus will be described with reference to FIG. 1.

FIG. 1 is a schematic view showing one example of an image forming apparatus to which the ink according to one embodiment can be applied.

The image forming apparatus shown in FIG. 1 is an inkjet printer 100.

The inkjet printer 100 includes a housing provided with a paper discharge tray 118, a paper feed unit provided in the housing, a medium holding mechanism, an inkjet head 115, and an ink cartridge 116.

The inkjet printer 100 includes a housing with the paper discharge tray 118. Cassettes 101a and 101b, a paper feed roller 102, a paper feed roller 103, a conveyance roller pair 104, a conveyance roller pair 105, a resist roller pair 106, a conveyance belt 107, a fan 119, a negative pressure chamber 111, a conveyance roller pair 112, a conveyance roller pair 113, a conveyance roller pair 114, an inkjet head 115, an ink cartridge 116, and a tube 117 are within the housing.

The ink cartridge 116 includes an ink cartridge body and ink housed in the ink cartridge body.

The cassettes 101a and 101b house recording media P of different sizes. The respective paper feed roller 102 or 103 takes out a recording medium P corresponding to the selected size from the cassette 101a or 101b and conveys the recording medium P to the respective conveyance roller pairs 104 or 105 and from which the recording media P travels to the resist roller pair 106.

Tension is applied by a driving roller 108 and two driven rollers 109 to the conveyance belt 107. In the surface of the conveyance belt 107, holes are provided at predetermined intervals. Inside the conveyance belt 107, the negative pressure chamber 111 connected to the fan 119 is placed for adhering the recording medium P on the conveyance belt 107 with suction. Along the conveyance downstream direction of the conveyance belt 107, the conveyance roller pairs 112, 113, and 114 are placed.

Hereinafter, an image forming operation of this inkjet printer 100 will be described.

First, an image processing unit starts image processing on image data to be printed and generates an image signal corresponding to the image data and also generates a control signal for controlling operations of the various rollers, the negative pressure chamber 111, and the like.

The paper feed roller 102 or 103 takes out the recording medium P one by one from the cassette 101a or 101b under the control of the image processing unit, and conveys the recording medium P to the conveyance roller pairs 104 or 105 and then on to resist roller pair 106. The resist roller pair 106 corrects any skew of the recording medium P and conveys the recording medium P at a predetermined timing to the conveyance belt 107.

The negative pressure chamber 111 suctions air through the holes of the conveyance belt 107. Therefore, the recording medium P is held to the conveyance belt 107 with suction and the recording medium P is conveyed to a position below the inkjet head 115 by the movement of the conveyance belt 107.

The inkjet head 115 ejects ink in synchronization with the timing of the recording medium P conveyance under the control of the image processing unit. In this manner, an image is formed at a desired position on the recording medium P.

Thereafter, the conveyance roller pairs 112, 113, and 114 function to discharge the printed recording medium P to the paper discharge tray 118.

Heating in a drying step after ink deposition on the recording medium P is not specifically described here, however, ink drying by heating may be performed as long as the drying temperature is lower than the melting point of the decoloring agent.

The printed image using the above-described ink can subsequently be decolored by heating the ink to the melting point of the decoloring agent or higher. The heating method and/or heating device utilized for the heating is not particularly limited, but may be for example, heating by friction or heating with a heater.

Here, an inkjet-type image forming apparatus is described as one example of the image forming apparatus, however, the image forming apparatus is not limited thereto. The image forming apparatus may be, for example, an image forming apparatus using screen printing, intaglio printing, or a letterpress printing process.

Further, as one embodiment of the application method of the ink, an example in which the ink is used in an image forming apparatus was described, however, the application method is not limited thereto. The ink may be used in, and applied by, for example, a writing instrument such as an ink pen.

EXAMPLES

Hereinafter, various examples will be described.
Preparation of Ink)

Example 1

An ink of Example 1 was prepared as follows.

First, 10 parts by mass of crystal violet lactone (Yamada Chemical Co., Ltd., hereinafter referred to as "CVL") as the color developable compound, 50 parts by mass of AEROSIL® 300 (Aerosil Co., Ltd.), as the color developing agent, and 800 parts by mass of acetone were mixed in a round-bottom flask and stirred. Thereafter, acetone was evaporated using a rotary evaporator, and the resulting material was further mixed using a physical mixer, whereby colored particles were obtained.

Subsequently, 80 parts by mass of MORESCO WHITE® P-40 (MORESCO Corporation) as the nonaqueous solvent, 5 parts by mass of the colored particles, and 15 parts by mass of xylitol, as the decoloring agent, were mixed, and the resulting mixture was ground using a bead mill, whereby an ink was prepared. The obtained ink is referred to as "ink I1". In the bead mill, beads having a diameter of 0.5 mm were used.

Further, the average particle diameter of fine particles contained in the ink was about 200 nm.

Example 2

An ink of Example 2 was prepared in the same manner as in Example 1 except that D-sorbitol was used as the decoloring agent. The obtained ink is referred to as "ink I2".

Example 3

An ink of Example 3 was prepared in the same manner as in Example 1 except that liquid paraffin (Wako Pure Chemical Corporation, CAS No. 8042-47-5) was used as the nonaqueous solvent. The obtained ink is referred to as "ink I3".

Example 4

An ink of Example 4 was prepared in the same manner as in Example 1 except that D-mannitol was used as the decoloring agent. The obtained ink is referred to as "ink I4".

Example 5

An ink of Example 5 was prepared in the same manner as in Example 1 except that trimethylolpropane was used as the decoloring agent. The obtained ink is referred to as "ink I5".

Example 6

An ink of Example 6 was prepared in the same manner as in Example 1 except that castor oil (Wako Pure Chemical Corporation) was used as the nonaqueous solvent. The obtained ink is referred to as "ink I6".

Example 7

An ink of Example 7 was prepared in the same manner as in Example 1 except that TECLEAN® N-16 (Nippon Petrochemicals Co., Ltd.) was used as the nonaqueous solvent. The obtained ink is referred to as "ink I7".

Comparative Example 1

An ink of Comparative Example 1 was prepared in the same manner as in Example 1 except that pure water was used in place of the nonaqueous solvent. The obtained ink is referred to as "ink C1".

Comparative Example 2

An ink of Comparative Example 2 was prepared in the same manner as in Example 1 except that ethanol was used as the notional decoloring agent. The obtained ink is referred to as "ink C2".

Comparative Example 3

An ink w of Comparative Example 3 as prepared in the same manner as in Example 1 except that n-nonanol was used as the notional decoloring agent. The obtained ink is referred to as "ink C3".

Comparative Example 4

An ink w of Comparative Example 4 as prepared in the same manner as in Example 1 except that 1,2-hexanediol was used as the notional decoloring agent. The obtained ink is referred to as "ink C4".

Comparative Example 5

An ink of Comparative Example 5 was prepared in the same manner as in Example 1 except that 1,6-hexanediol was used as the notional decoloring agent. The obtained ink is referred to as "ink C5".

Incidentally, this notional decoloring agent had a solubility of 0.1% or more in the nonaqueous solvent.

Comparative Example 6

An ink of Comparative Example 6 was prepared in the same manner as in Example 1 except that EMULGEN® 103

(Kao Corporation) was used as the notional decoloring agent. The obtained ink is referred to as "ink C6".

(Evaluation)

The above-described example inks were evaluated as follows. By using the ink I1, a coating film composed of the ink was formed with a hand coater (RK Print Coat Instruments Ltd.), and the image density after drying was measured using a densitometer (X-Rite eXact). Further, this coated film was heated to 100° C., and the image density after heating was then remeasured.

With respect also to the inks I2 to I7 and the inks C1 to C6, the measurement of the image density was performed in the same manner. The results are shown in Table 1.

TABLE 1

|  | Image density after drying | Image density after heating | Ink hue |
| --- | --- | --- | --- |
| Ink I1 | 0.6 | 0.15 | Deep blue |
| Ink I2 | 0.6 | 0.18 | Deep blue |
| Ink I3 | 0.6 | 0.16 | Deep blue |
| Ink I4 | 0.6 | 0.17 | Deep blue |
| Ink I5 | 0.5 | 0.15 | Deep blue |
| Ink I6 | 0.6 | 0.16 | Deep blue |
| Ink I7 | 0.6 | 0.16 | Deep blue |
| Ink C1 | 0.2 | 0.2 | Light blue |
| Ink C2 | 0.4 | 0.4 | Light blue |
| Ink C3 | 0.3 | 0.3 | Light blue |
| Ink C4 | 0.2 | 0.2 | Light blue |
| Ink C5 | 0.3 | 0.2 | Light blue |
| Ink C6 | 0.15 | 0.15 | Light blue |

As shown in Table 1, the images formed using the inks I1 to I7 showed excellent performance with respect to color developing performance after drying (high image density) and decoloring performance after heating (lowered image density).

On the other hand, the images formed using the inks C1 and C3 to C6 had low color developing performance (low image density), and also the decoloring performance was hardly if at all observed (the post-heating image density was substantially equal to pre-heating image density). This is considered to result from the use of a material that was soluble in the solvent as the decoloring agent. When such a material is used, the decoloring agent will decolor the color developable compound even without heating. Therefore, a decoloring effect with heating will not be observed.

Further, with respect to the ink C2, the image density immediately after application was 0.15, but was increased to 0.4 after drying. This result is considered to be because phase separation in the ink during the period before drying was completed immediately after application. Further, a change in the image density before and after heating was not observed. This is considered to be because ethanol is lost by evaporation in the drying process.

The present disclosure is not limited to the specific embodiments described above and can be modified variously without departing from the gist of the present disclosure in implementation. Also, the respective embodiments may be appropriately combined, and combined effects can be obtained in that case. Various modifications, including omissions of certain aspects, of the example embodiments will be apparent to those of ordinary skill in the art in view of the present disclosure. Such variants are within the scope of the present disclosure.

What is claimed is:

1. An ink, comprising:
a color developable compound;
a color developing agent that causes the color developable compound to develop a color;
a nonaqueous solvent; and
a decoloring agent that is insoluble in the nonaqueous solvent and causes the color developable compound to decolor upon heating, wherein
the color developable compound and the color developing agent are directly bound to one another as a plurality of first particles dispersed in the nonaqueous solvent, and
the decoloring agent is dispersed as a plurality of second particles in the nonaqueous solvent.

2. The ink according to claim 1, wherein the color developing agent is a silicon oxide.

3. The ink according to claim 1, wherein the decoloring agent is a polyhydric alcohol.

4. The ink according to claim 3, wherein the decoloring agent is a sugar alcohol.

5. The ink according to claim 1, wherein the nonaqueous solvent is a liquid paraffin.

6. The ink according to claim 1, wherein the color developable compound is a leuco dye.

7. The ink according to claim 1, wherein the decoloring agent has a melting point of greater than 40° C.

8. The ink according to claim 1, wherein the average particle diameter of the second particles dispersed in the nonaqueous solvent is less than 1000 nm.

9. The ink according to claim 1, further comprising at least one of a stabilizing agent, viscosity adjusting agent, or a preservative.

10. The ink according to claim 1, wherein the average particle diameter of the first particles dispersed in the nonaqueous solvent is less than 1000 nm.

11. An ink, comprising:
a nonaqueous solvent;
a plurality of colored particles dispersed in the nonaqueous solvent, the colored particles comprising a color developable compound bound to a color developing agent that causes the color developing agent to develop a color; and
a plurality of decoloring particles dispersed in the nonaqueous solvent, the decoloring particles comprising a decoloring agent that is insoluble in the nonaqueous solvent and causes the color developable compound to decolor upon heating.

12. The ink according to claim 11, wherein the nonaqueous solvent is a liquid paraffin.

13. The ink according to claim 11, wherein the decoloring agent is a polyhydric alcohol.

14. The ink according to claim 11, wherein the color developing agent is silica.

15. The ink according to claim 11, wherein the color developable compound is a leuco dye.

16. The ink according to claim 11, wherein the average particle diameter of the colored particles and the decoloring particles in the nonaqueous solvent is less than 1000 nm.

17. The ink according to claim 16, wherein
the color developable compound is a leuco dye,
the color developing agent is silica, and
the decoloring agent is a sugar alcohol having a melting point in a range of 40 to 250° C.

18. A method for forming an image, the method comprising:
applying an ink to a recording medium, wherein
the ink comprises:
a nonaqueous solvent;
a plurality of colored particles dispersed in the non-aqueous solvent, the colored particles comprising a color developable compound bound to a color developing agent that causes the color developing agent to develop a color; and a plurality of decoloring particles dispersed in the nonaqueous solvent, the decoloring particles comprising a decoloring agent that is insoluble in the nonaqueous solvent and causes the color developable compound to decolor upon heating.

19. The method according to claim 18, wherein applying the ink to the recording medium comprises ejecting the ink from an inkjet printhead.

20. The method according to claim 18, wherein the average particle diameter of the colored particles and the decoloring particles in the nonaqueous solvent is less than 1000 nm.

* * * * *